Figure 1:
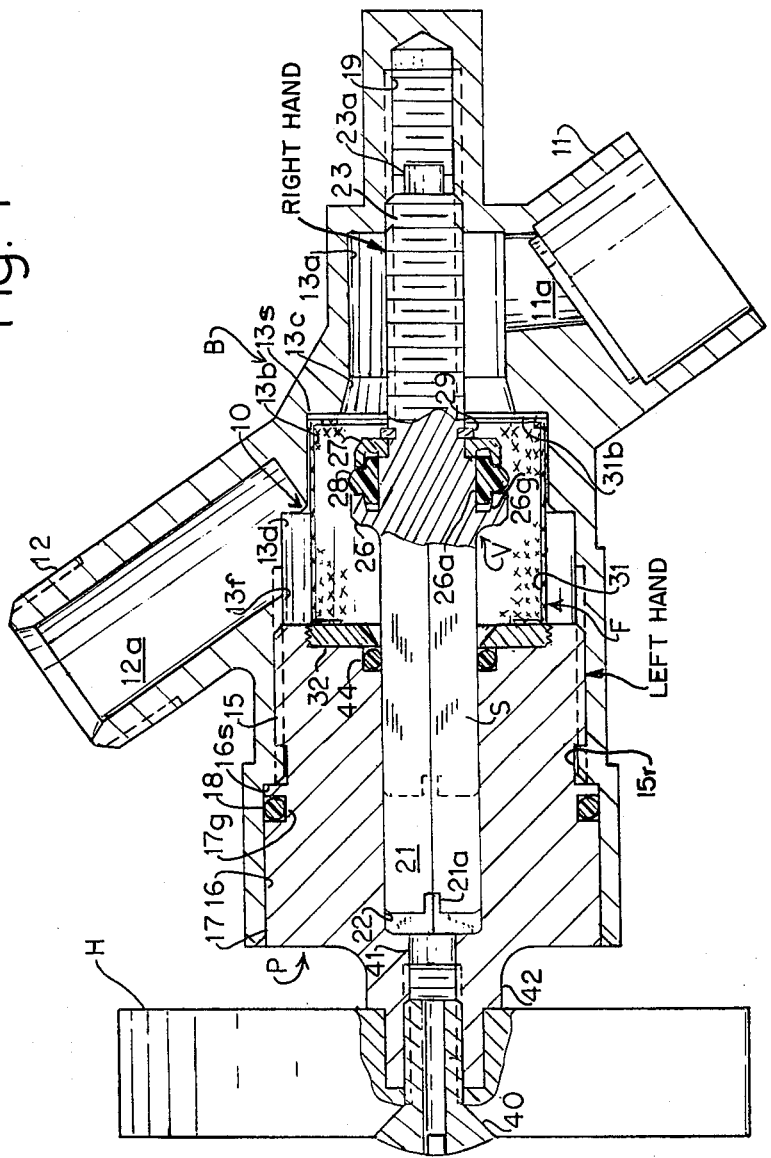

United States Patent [19]
Botnick

[11] 3,891,001
[45] June 24, 1975

[54] SHUTOFF VALVE WITH CLEANOUT FILTER

[76] Inventor: Irlin H. Botnick, 3155 Kersdale, Pepper Pike, Ohio 44124

[22] Filed: Dec. 14, 1973

[21] Appl. No.: 424,898

[52] U.S. Cl............................. 137/549; 137/627.5
[51] Int. Cl.......................... E03b 7/07; F16k 11/10
[58] Field of Search................. 137/549, 627.5, 596

[56] References Cited
UNITED STATES PATENTS
| | | | |
|---|---|---|---|
| 1,585,908 | 5/1926 | Moorman | 137/627.5 |
| 2,412,613 | 12/1946 | Grant | 137/627.5 |

*Primary Examiner*—Henry T. Klinksiek
*Attorney, Agent, or Firm*—P. D. Golrick

[57] ABSTRACT

An internal valving stem with piston type valving member, and a handle-carrying operating plug serving also a body-closing bonnet function, have opposite-handed threaded engagement with the body and a sliding relatively non-rotational engagement with each other, whereby as the valving member is advanced inwardly in the body from a retracted open position to a closed position, the plug moves out; and with a permitted further valving member advance after valve closing, the plug is free for withdrawal from the body for cleaning of a plug-carried filter and/or line drainage; ensuring a shut off condition when the valve body is opened for cleaning or line drainage. A variant valving is disclosed.

18 Claims, 3 Drawing Figures

SHUTOFF VALVE WITH CLEANOUT FILTER

In the valve prior art, both patented and not, shutoff valves, especially for water lines within residences, or like-sized lines in other environments have been long known providing for drainage of the line on the valve discharge side after the valve is shut off, in so-called stop-and-waste valves; and so also valves including filter device to prevent passage of dirt or debris from the inlet line to the discharge side. Such prior structures, whether merely proposed or actually commercially produced, where they have at least attained their intended functions, have been burdened by various undesirable features or disadvantages. Commonly with valves and faucets generally, the valving seal element compressed against a seat has been subject to damage by overtightening on closure. In drainable valves, i.e., stop-and-waste valves, the drainage has been slow; or the drainage control expedients unreliable or easily subject to damage in use. Valves for such service having a filter element accessible for cleanout often have been awkward to clean, or had low filter capacity requiring in some installations frequent cleaning; with the result that the service operations were unduly time consuming, and often by frequent repetition subjecting the valve to considerable wear and tear. Moreover where a valve body would be opened to the environment for drainage or filter cleaning, the valve could be left on, therefore under supply pressure, so that one servicing the same could be sprayed or flooded with water, a dangerous accident with the supply water hot. Or the structures have been relatively complicated or expensive in fabrication for the function involved and the avoidance of other problems.

The present invention proposes a relatively simple shutoff valve structure, which incorporates a filter screen device of relatively high capacity without undue plugging and affords a simple procedure for cleanout, while automatically ensuring that the valve is turned off; and also enables rapid drainage of the outlet or discharge line at the same time as the cleaning operations. Moreover, the valve structure for conjointly attaining these advantageous characteristics can be manufactured at comparatively low cost, with a comparatively long service life to be expected.

The general object of the present invention is to provide a shutoff valve incorporating a cleanable filter element and also enabling quick line drainage.

Another object is to provide a valve of the character described which has a durable comparatively low cost structure.

A still further object is to provide a valve of the character described which automatically ensures that the water is shut off before the valve body can be opened in drainage or filter removal operations.

Other objects and advantages will appear from the following description and the drawings wherein:

In the drawing FIG. 1 is a longitudinal axial section of one embodiment.

Figure 2:
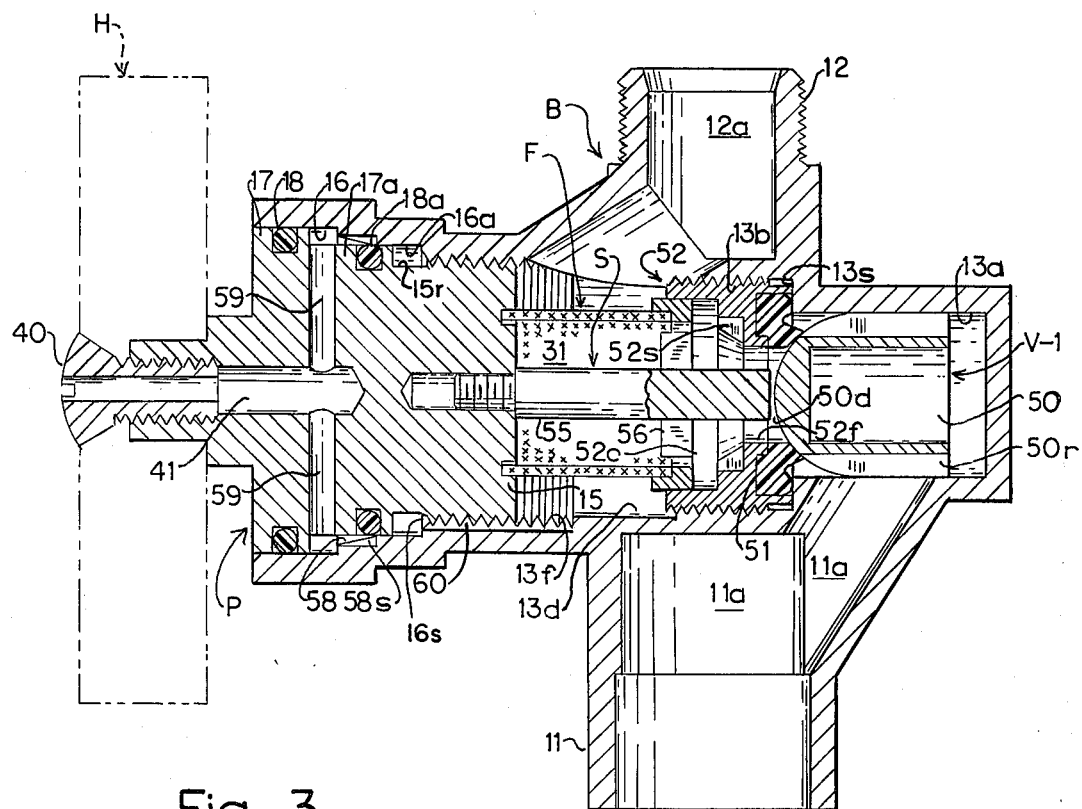

FIG. 2, similar to FIG. 1, shows a modification.

Figure 3:
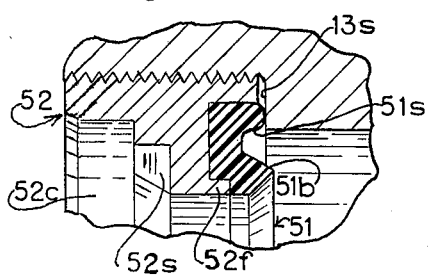

FIG. 3 is a fragmentary sectional detail of a valving seat and seal, useful in FIG. 2.

The invention is shown as embodied in a valve represented on an axial longitudinal section and comprising as principal components a hollow body B with a main bore of successively reduced diameters and providing a valving chamber 10 with an inlet and outlet connections 11, 12; a valving member V carried by, and axially moveable in the chamber between valve normal open and closed positions upon rotation of a stem S with inner end having a threaded engagement with the closed body end beyond the inner end of the chamber; a valve-operating body-closure plug P having with the body a threaded engagement of like pitch but opposite hand to that of the stem, with which it has a sliding non-rotational operating engagement; an operating handle H conventionally splined and screw-secured on a projecting reduced outer part of the plug; and a cylindrical debris catching filter screen device F mounted in the plug within the chamber.

In the body B, the inlet passage 11a opens laterally to a smaller inner bore portion 13a, and the outlet passage 12a intersects and opens from the larger diameter outer bore portion 13b of the valving chamber, so that when the valving member V moves, from the drawing represented valve open position, past the lead-in taper 13c as a valved aperture region to a closed position in the inner bore 13a, circumferentially sealing to the cylindrical surface thereof in piston-like fashion, the fluid flow path through the chamber from inlet to outlet is blocked. A further bore enlargement, at its inner end 13d offering increased chamber flow area to the outlet, is female-threaded at 13f to its outer end to receive the slightly reduced, male-threaded plug end 15; while an unthreaded counterbore 16 running in from the body open end provides a smooth cylindrical guiding surface for the slightly enlarged plug cylindrical outer end 17 rotatably and slideably sealed thereto by an O ring 18 in circumferential plug groove 17g. There is a preferred relief 15r behind the threads of 15.

The taper 13c is provided to prevent damage to the hereinafter described seal device on valve member V in passing the radial shoulder between 13a and 13b to enter 13a. Other lead-in chamfers are conventionally provided from the finished open end face into counterbore 16, and into the female threads 13f and 19.

To provide the relatively non-rotational but coaxially slideable connection between stem and plug, the stem outer shank portion 21, having a non-circular, say square, section, is slideably received in a mating female plug axial passage or formation 22; while the inner stem portion 23 is male threaded for operative engagement in the female-threaded blind bore 19 at the bottom of the body cavity. For assembly convenience and other purposes, there is a screw driver slot 21a in the outer stem shank end face; and the threaded inner stem end terminates at 23a in a reduced "dog point" form as a stop.

Valving member V here is provided between 21 and 23 by an integral stem enlargement 26, retainer 27 held cooperating therewith to secure a resilient elastomeric seal ring 28 sealed to the stem structure and projecting circumferentially from a consequent circumferential groove-like environment to seal to the bore wall 13a; this seal assembly being secured by a split ring 29 recieved in a stem groove located on an unthreaded portion of the stem just beyond a reduced cylindrical portion 26a of the enlargement.

As described in the Botnick copending application, Ser. No. 382,946, filed July 26, 1973, (entitled "Fixture Shutoff Valve with Drain") now U.S. Pat. No. 3,828,815 this seal ring, of neoprene or the like and in axial section having a somewhat blunt or stubby T-shape, may have the integral form of a short sleeve with a mid-length circumferential girdle, semi-circularly arcuately rounded, with arcuate section circumferential beads on each side of the girdle, i.e., on the ends of the sleeve, with the enlargement providing a flange recessed with a groove 26g having a female conical outer groove wall surface and a male cylindrical inner wall surface carried out in a hub portion of the stem receiving at least the major part of the ring sleeve, the retainer having a face recess with a similar conical wall, so that as the retainer and flange "sandwich" the ring therebetween under some compression, with the ends received within the conical surfaces but with axial end clearance, the sleeve ends are cammed inward in collet-like fashion not only for ring retention, but also sealing on the male cylindrical part of the stem structure.

The filter screen F located in the outer part of the valving chamber, basically is a sleeve or cylinder 31 of wire mesh screen, with outer end brazed to a flat nut 32 having a circular central aperture of diameter sufficient to clear stem shank 21 and threaded into a concentric end recess of and supported by plug P. The nut 32 may have its round central aperture taper-walled as a lead-in into the square passage mouth, which also may have lead-in slopes to the walls of the square. The inner end 31b of the screen is flanged radially inwardly to form a short lip for debris retention during plug removal. When the plug is in axial inward position as shwon for the valve "on," the screen extends toward shoulder 13s, with about half the length received in fairly close slide fit in 13b, so that water passing through the valve enters the screen element endwise to pass the valve member V and flow radially outwardly, particularly at the bore enlargement 13d to pass circumferentially through the flow space external of the screen to the outlet.

Further to provide slower controlled drainage, the handle securing screw 40 may be tubular, and the hole 41, tapped to receive the same in the plug teat or projection 42, carried through into the end of the square passage 22 of the plug. Then an O ring type shank sealing element 44 (preferably molded to a square) is located in a square-sectioned groove cut in the four sides of the mouth to square passage 22, at the bottom of the recess receiving nut 32, thereby to seal against leakage until, after valve closure, at least the bottom of the screw driver slot 21a passes the shank seal 44.

With the threads at 23–19 right hand, those at 15–13f left hand but like pitched, and the elements associated with the stem and the plug respectively sub-assembled, the stem is first threaded completely into the threaded bore 19, bringing the seal of V into the region between inlet 11a and taper 13c, that is, a closed position. Conveniently the stop 23a is bottomed, then the stem backed off part of a turn.

Then the threaded end of plug P is inserted into the cylindrical outer counterbore 16, and rotated as needed to bring the mouth of the plug recess over the end of shank 21, and with counter-clockwise plug rotation, the plug-to-body threaded engagement is mode, and the stem shank 21 is picked up rotationally in plug recess 22, starting to back the valve member V out toward taper 13c, as the plug advances inwardly. With the valving seal still inward of the taper 13c, the valve stands assembled, but closed.

With further counter-clockwise rotation, the plug continues to advance inwardly until the plug shoulder 16s is stopped by the counterbore shoulder as shown, with the stem simultaneously withdrawing to full open position. The O ring 18 seals the plug to the body when the valve is even slightly open; and the plug serves also the function of a bonnet closing the body.

Accordingly the length of the counterbore, the plug and lengths of thread engagements, the screw driver slot depth and shank seal location are selected with appropriate relations for the described mode of operations.

By reverse rotation, i.e., clockwise, the reverse action occurs, and when the valve member seal passes taper 13c, the valve is shut off. Slight further rotation brings seal 44 to the slot 21a to begin controlled drainage. Then if it be desired to remove the filter for cleaning, further clockwise rotation, which may be simply continued until stop 23a bottoms, not only advances the stem in its "off" condition, but backs the plug out a bit further to clear the plug threads, allowing the entire handle, plug and filter sub-assembly to be withdrawn from the body for cleaning. Also the removal of the plug allows the valve and the line connected to its outer side to drain.

Necessarily the valve is shut off when access is obtained to the filter for cleaning or the plug removed for drainage, so that water, especially dangerous when hot, cannot accidently flood out or spray out on the one servicing it. The seal is not subject to damage by overtightening; and the entire structure represents a sturdy, simple, durable low cost construction.

The hollow body B may be produced first as a "blank" by modern techniques of forging and extrusion to external form, thereafter machined with the several bore and passage formations; and by casting with appropriate coring, also with approximately sized open ended chamber and inlet and outlet connection formations and even internal inlet and outlet passages, followed by minimum machining. In the case of extrusion a bar may be produced of solid section represented by the external outline of the body in the drawings and then cut into successive blocks forming the blanks for subsequent machining. The inlet and outlet here happen to be shown in extending oblique to the body main axis to allow a coaxial alignment thereof, facilitating machining of male or female pipe threads or standard sockets or external diameters for pipe sweated connections. On the other hand, the several coaxial threaded and cylindrical bores and tapered formations of the body main bore may be machined after a single chucking operation in screw machine operations.

In FIG. 2 wherein elements similar to those of FIG. 1 are designated by like reference numerals or characters and the valve is shown in shut-off but non-draining condition, the specific valve presents a body B with aligned inlet and outlet connections 11, 12 having a form and disposition also useable in the valve of FIG. 1; and also a specific valving arrangement for the principal line shut-off function which affords certain advantageous simplification of structure, component fabrication, assembling and servicing, and in general otherwise retaining the advantages of the previously described valve.

Here the valving member V-1, a molded plastic or cast metal element of water-resistant material, comprises a hollow cylindrical body 50, with a plurality of at least three equi-spaced integral longitudinal guide ribs 50r defining flow passages past the body with, and slideably engaging, a cylindrical wall of the inner part of the stepped bore forming a valving chamber inward of plug P, namely on the inner bore portion 13a in which the member V-1, shuttle-like shifts to and fro relative to a valve-closed position where its round nose end wall 50d comes into sealed relation with an elastomeric seal washer element 51 clamped against a bore shoulder 13s by an externally threaded retainer ring 52 screwed into the female threaded bore part 13b. The valving member is displaced from the seat to open positions by advance of stem S.

Ring 52 at its inner end may have a slight outer circumferential shoulder or lip to engage a shoulder at the inner end of threaded bore 13b as a stop upon insertion; and has an outer end counterbore 52c to receive slideably the inner end of filter structure F, towards its other end an axially projecting lip or flange 52f about its flow aperture to center and support the washer or seal element 51, and at 52s in the counterbore shoulder, insertion or driving tool-engaging notches. FIG. 3 shows details of the seal element 51 and ring 52, but with the latter not bottoming on shoulder 13s.

A circular seat rib 51b, around the valved central flow aperture through 51 and roughly triangular in cross-section, provides an annular inner face for a sealing seating of the rounded nose 50d of valving member 50, and an external sloping annular face exposed to inlet water pressure to afford a pressure-assisted seal with member 50, which is urged into closed position by the inlet water flow and finally there held by static inlet pressure. The inner face of 51b considered in section preferably has a concavity or slope such that its apical outer region is first contacted by 50d.

Seal 51 has basically flat annular body preferably received in, but projecting slightly from a shallow broad flat-bottomed face groove in the end of ring 52 surrounding 52f, but recessed to receive and be centered and supported by flange 52f, and on its other face, concentric with rib 51b, at its outer peripheral margin, having another annular seal rib 51s of half-round section functioning like an O-ring as clamped against shoulder 13s.

The aforegoing modification on the principal valving structure permits the same basic body structure to assume a right angle form, that is, with the inlet connection placed on the bottom of the inlet valving chamber part 13a in alignment with the several successive portions of the main bore, by merely including a valving member retaining slight constriction or shoulder at the bottom of 13a around the inlet opening from the inlet connection; thus further simplifying production machining operations; and further enables simplification of the operating structure for the main and drainage valving.

The operating stem S takes the form of a push-rod 55, at its outer shoulder threaded end screwed coaxially into plug P; its inner end being engageable upon counter-clockwise rotation of left hand threaded plug P by a turn or two to close off the later described drainage passages, and to engage valving member V-1 and displace it away from its seat to progressively more open positions.

In the stem structure, push-rod 55 towards its inner end carries at 56, in a spider type arrangement, a plurality of preferably at least three equi-angularly spaced radial arms rimmed by a ring closely slideable in retainer counterbore 52c and having its inner periphery in effect rabbeted to receive and support the outboard end of the cylindrically formed wire or plastic mesh filter screen element 31 having its other end engaged in a narrow concentric circular slot in the inner face of the plug. The spider and ring arrangement preferably is integral with rod 55, being thus easily produced in water resistant plastic, for example.

The outer end of the body is doubly counterbored, outward of the left hand female or internal threads at 13f, to provide two circumferential cylindrical surfaces 16 and 16a of different diameters against which two correspondingly sized axially spaced outer plug end portions 17 and 17a are circumferentially sealed by respective groove-received O-rings 18 and 18a; a lead-in taper or bevel 58 for O-ring 18a being provided from the bottom of the outermost counterbore 16 to the cylindrical surface of the second counterbore 16a.

The axial hole 41 for the tubular handle-retaining screw 40 extends to intersect a plurality of at least two and preferably more equi-angularly spaced radial passages 59 opening on the first reduced cylindrical surface 17a of the plug P, thus at an axial location between the O-rings 18a and 18, being close to the latter.

A plurality of at least two and preferably four or more equi-spaced longitudinal slots 60 extend from the bore 13d to the shoulder 16s to provide drainage passages from the outlet side of seat 51, i.e., for draining the piping connected to outlet 12; being formed either in the body B to run through and somewhat deeper than the female threads at bore 13f, or similarly disposed to run through the male threads of the inner end 15 of the plug P; in either case being more simply provided than drilled plug passages from the inner plug face to the male threaded region just inward of O-ring 18a.

With this arrangement when the valving member V-1 seats and shuts off the inlet, with the rod 55 just leaving engagement therewith, the O-ring 18a is yet in the bore 16a and accordingly the drainage passages 41, 59 are blocked from communication with the slots or passage 60. Thus the valve is shut off, but no drainage can occur. However, with another turn or so clockwise, the O-ring 18a reaches bevel 58 and passes out of sealing relation in bore 16a, putting slots 60 in communication with the exterior through 59, 41 for drainage setting as shown.

Into the tapered or chamfered lead-in surface at 58, a plurality of equi-spaced sloping axially running slots are cut at 58s, the bottoms of which rise to the intersection of the tapered surface with the inner counterbore 16a; these slots providing quicker drainage.

If it is desired to service the filter, with the hereinafter described cap removed, the clockwise turning of the handle is continued, until the plug P is completely backed out of the threaded engagement with the body, permitting it to be withdrawn therefrom with the filter attached.

Where the filter component is not required and thus no point to ready plug removal, the outer end of the body may be threaded, and a simple external internally threaded cap nut or ring, having an inner peripheral lip to afford a stop shoulder to plug P, may be screwed onto the body, if it is desired to prevent accidental full release of the plug. In such case also a simple push rod 55 may be used.

What is claimed is:

1. A shutoff valve with discharge line drainage capability comprising:

a hollow valve body as an integral structure having a main bore successively reduced in diameter from a counterbored open end of the body inwardly to form a valving chamber at an inner portion of the main bore, said main bore having an outer female-threaded reduced diameter portion inward of the counterbored end portion and spaced outwardly of said valving chamber, said valving chamber including an inner smaller diameter bore portion and an outer larger diameter bore portion, said body having an inlet connection with inlet passage opening to the inner portion of the said chamber and having an outlet connection with an outlet passage opening to the larger portion of the chamber;

a valving member axially shiftable, to and from a valve closing location in the inner bore portion and valve opening locations;

a rotatable and axially shiftable valving member operating shaft structure including a stem axially aligned with said valving member, and a stem-operating and body-closing rotatable plug having an inner male-thread and engaged in the said outer female threaded portion of the bore, and a larger diameter outer end portion guidably received in and rotationally and axially slideably sealing with said counterbored open end;

a valve drainage discharge passage in said plug opening exteriorly of said body for valve drainage discharge and opening interiorly of said body through a path opened and closed by axial positioning of a portion of said plug;

said operating structure adapted upon plug rotation in one direction to position said valving member into valve open position with said plug advanced into the body and sealing to said counterbored open end, and by plug rotation in the other direction controlling shift of said valving member to a flow blocking position in the valving chamber, with the plug retracted yet in threaded and sealing engagement with the body when the valve closes, and upon further plug retracting rotation axially positioning the plug to open said path for drainage, and with still further rotation to free the plug from the bore for removal with the inlet shut off.

2. A valve as described in claim 1, wherein the inner end of said plug carries a coaxial cylindrical filter screen sleeve with one end closed by engagement with the plug and the other end open, said valving chamber is provided with a local counterbore formation surrounding a flow opening from said inner portion of, and to the said outer portion of, the valving chamber, said formation slidably rotationally receiving a portion of the other, open end of said filter sleeve, for all plug positions corresponding to valve open settings of the said operating structure.

3. A valve as described in claim 1, wherein the open end of said body is double counterbored providing outer and inner end-counterbores with a sloping, beveled shoulder between cylindrical surfaces of the counterbores;

said plug has, outward of said male-threaded end, two male cylindrical portions of successively larger diameters circumferentially rotationally and slideably sealable to respective cylindrical surfaces of the counterbores;

the sealing portion on the inner smaller diameter male cylindrical portion being remote from the larger diameter male cylindrical portion;

said discharge passage opens through said smaller diameter male portions cylindrical surface axially outward of said sealing portion and one of said plug and body has therein a flow passage communicating with the outer larger portion of the valving chamber and with the inner end-counterbore, thereby providing a said path opened and closed by shift of the axial position of said sealing portion relative to said beveled shoulder.

4. A valve as described in claim 3, wherein said plug is sealed relative to the inner and outer end-counterbores by O-rings received in respective grooves in said male cylindrical portions.

5. A valve as described in claim 3, wherein said flow passage is formed in said body.

6. A valve as described in claim 3, wherein the outer portion of said valving chamber terminates in an inner female threaded portion adjacent a shoulder surrounding the flow path from the chamber inner portion;

a washer-like seal element having outer periphery sealingly engaging the last said shoulder affords an apertured valving seat facing the chamber inner portion;

a male-threaded clamping ring is screwed into the inner female threaded portion to removably clamp said seal element against said shoulder;

said valving member comprises a shuttle-like element axially slideable in the valving chamber inner portion, to and from a valve closing position with one end sealingly engaging said valving seat, said shuttle-like element with a surrounding cylindrical surface of the chamber inner portion defining flow space from the valve inlet to the apertured seat; and in said operating structure the said stem serves as a push-rod engageable with said one end of the shuttle element to displace it against inlet water pressure from said seat, and to hold it displaced in an open position against water flow pressure forces urging it back to closed position.

7. A valve as described in claim 6, including said cylindrical filter screen sleeve coaxially disposed about said push-rod, and having one end closed and supported by the inner end of said plug, and the other end supported by a spider structure adjacent the shuttle-element-engaging end of the push-rod;

said ring having a counterbore formation rotatably slideably closely embracing the said other end of the screen sleeve.

8. A valve as described in claim 7, wherein said push-rod has one end threaded and screwed into said plug and has the screen supporting structure integrally formed therewith.

9. A valve as described in claim 1, wherein said main bore terminates in an inner female threaded portion beyond said valving chamber at a closed inner end of the body;

said valving chamber including a lead-in taper from said outer to inner portion of the chamber;

said body inlet passage opening to the inner portion of the chamber remote from the said taper;

said stem is a valving-member-carrying stem having a male-threaded inner stem part engaged in the said inner female-threaded portion of said bore, having a shank of non-circular cross section aligned with said inner part, and includes said valving member between the shank and male-threaded part, said valving member carrying an annular seal element adapted to make a circumferential seal between the stem and the surface of the inner portion of said chamber, said valving member being axially shiftable, upon stem rotation, to and from valve closing locations in the chamber inner portion and valve opening locations in the chamber outer portion;

said plug having a stem-shank-receiving passage running coaxially in from its inner end, with a cross section complementary to the stem shank, whereby a relatively non-rotating slideable connection is made between the plug and the stem;

the threaded engagements of said stem and said plug with the body being of opposite hand and mutually adapted upon plug rotation in one direction to position said valving member retracted into open position in the said chamber with said plug advanced into the body and sealing to said counterbore, and by plug rotation in the other direction to position said valving member advanced into flow blocking condition in the chamber inner bore portion with the plug retracted yet in threaded and sealing engagement with the body, and upon further plug retracting and stem advancing rotation to free the plug from the bore for removal with the inlet shut off, and allow outlet line drainage through the body.

10. A valve as described in claim 9, including a debris filter device removable for cleaning, said device comprising a cylindrical screen having one end secured coaxially to an inner end face of the plug and its other inner end open, said screen extending into the chamber and at its inner end closely fitted circumferentially to a bore wall portion of the chamber so that water flowing from the inlet to outlet is constrained to pass endwise into, and radially through the filter to the outlet, for retention of debris within the screen cylinder, the chamber providing a flow space externally circumferential of at least a part of the screen length to the outlet;

whereby said screen is removable with the plug for cleaning purposes, only upon plug retracting rotation beyond a point where the valve has been closed.

11. A valve as described in claim 9, wherein the said outer end portion of the plug has a circumferential groove and an O ring received therein to provide the rotational and slideable seal of the plug to the body counterbore.

12. A valve as described in claim 9, wherein the inlet and outlet connections have coaxially aligned pipe joining formations.

13. A valve as described in claim 9, wherein said plug has a coaxial reduced projection on its outer end with a handle secured thereon.

14. A valve as described in claim 10, wherein said screen has one end affixed to an externally threaded disk centrally apertured to provide clearance with said shank end and engaged in a concentric female threaded recess on the inner face of said plug;

the other open end of the screen being flanged radially inwardly to form a debris retention lip.

15. A valve as described in claim 9, wherein said stem-shank-receiving passage has adjacent the plug inner end an O-ring type seal onto said shank;

said plug has a coaxial reduced projection on its outer end with a valve operating handle secured thereon by a tubular screw threaded into a coaxial hole extending to said passage;

the end of said shank engaged in said passage has a formation of axial length sufficient to provide a drainage flow path from the valving chamber to said passage past the O-ring seal on the shank after the plug has shifted axially to a position corresponding to valve shut off condition and with the shank yet engaged in the plug.

16. A valve as described in claim 1, wherein the outer portion of said valving chamber terminates at an inwardly facing apertured valving seat surrounding the flow path from the chamber inner portion;

said valving member comprises a shuttle-like element axially slideable in the valving chamber inner portion, to and from a valve closing position, with one end sealingly engaging said valving seat, said shuttle-like element with a surrounding cylindrical surface of the chamber inner portion defining flow space from the valve inlet to the apertured seat; and in said operating structure the said stem serves as a push-rod engageable with said one end of the shuttle element to displace it inwardly from said seat to an open position and to hold it displaced in an open position against forces urging it back to closed position against said seat.

17. A shutoff valve comprising:

a hollow valve body having an inlet, an outlet, and a valved aperture partition between the inlet and outlet providing a valve seat in the flow path from inlet to outlet;

a valving member operably shiftable between a shut off position and open position relative to and cooperating with the valved aperture for opening and shutting the flow path;

said valve having an open end providing an opening into the valve body-hollow on the outlet side of the said aperture;

filter screen means removable from and insertable into the valve body through said open end into a filtering disposition between said aperture and said outlet;

operating means for operating said valve member including a removable sealing closure for the body open end;

said operating means being effective for shutting off the valve as said closure is being removed from the body and maintaining a closure seal until the valve is shut off, whereby the valve is put in a shut off condition by, and before completion of removal of the closure for access to and removal of the screen for servicing.

18. A valve as described in claim 17, wherein said operating means is adapted to provide a drainage path from the body-hollow on the outlet side of said aperture after the valve is shut off and before the removal of said closure from the body.

* * * * *